United States Patent
Kordun

(10) Patent No.: US 8,001,186 B2
(45) Date of Patent: Aug. 16, 2011

(54) METHOD AND SYSTEM FOR PROVIDING COLLABORATIVE MODERATION AND CORRECTION OF MESSAGE HISTORY IN AN INSTANT MESSAGING SESSION

(75) Inventor: Alexander Kordun, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/559,885

(22) Filed: Sep. 15, 2009

(65) Prior Publication Data

US 2010/0011080 A1 Jan. 14, 2010

Related U.S. Application Data

(63) Continuation of application No. 11/837,504, filed on Aug. 11, 2007, now abandoned.

(51) Int. Cl.
*G06F 15/16* (2006.01)
(52) U.S. Cl. ........ 709/204; 709/203; 709/246; 715/252; 715/253
(58) Field of Classification Search ............. 709/246, 709/203–206; 715/750, 751–753
See application file for complete search history.

(56) References Cited

U.S. PATENT DOCUMENTS

| | | | |
|---|---|---|---|
| 7,503,007 B2 * | 3/2009 | Goodman et al. | 715/758 |
| 7,543,033 B2 * | 6/2009 | Vincent | 709/206 |
| 2002/0194278 A1 * | 12/2002 | Golan | 709/206 |
| 2003/0023689 A1 * | 1/2003 | Brown et al. | 709/206 |
| 2005/0166154 A1 * | 7/2005 | Wilson et al. | 715/751 |
| 2005/0278413 A1 * | 12/2005 | Tannenbaum | 709/202 |
| 2006/0293914 A1 * | 12/2006 | Fukuoka | 705/1 |
| 2007/0100952 A1 * | 5/2007 | Chen et al. | 709/207 |
| 2007/0124387 A1 * | 5/2007 | Galloway | 709/206 |
| 2007/0198648 A1 * | 8/2007 | Allen et al. | 709/207 |
| 2008/0189622 A1 * | 8/2008 | Sanchez et al. | 715/752 |
| 2008/0256190 A1 * | 10/2008 | Ryan et al. | 709/206 |
| 2008/0301228 A1 * | 12/2008 | Flavin | 709/204 |

\* cited by examiner

*Primary Examiner* — Oanh Duong

(74) *Attorney, Agent, or Firm* — David A. Dagg

(57) ABSTRACT

A system for providing collaborative moderation and correction of instant messaging session transcripts in an instant messaging session that includes an improved instant messaging client user interface that allows collaborative editing and moderation of an instant messaging session transcript in order to correct for errors. An instant messaging client operates to seek approval of changes to the session transcript during the session, and stores transcript changes such that the modifications are conveniently viewable by all session participants. The instant messaging client can be configured to automatically accept requests to modify the session transcript. Alternatively, the instant messaging client can be configured to explicitly notify and seek approval from all other participants when a participant attempts to make a modification to the session history. The time of each modification, and the identity of the participant making each modification, are stored within the session history.

16 Claims, 7 Drawing Sheets

METHOD AND SYSTEM FOR PROVIDING COLLABORATIVE MODERATION AND CORRECTION OF MESSAGE HISTORY IN AN INSTANT MESSAGING SESSION

CROSS-REFERENCE TO RELATED APPLICATIONS

The present application is a Continuation under 35 U.S.C. 120 of commonly assigned prior U.S. application Ser. No. 11/837,504, filed Aug. 11, 2007 in the name of Alexander Kordun, now allowed.

FIELD OF THE INVENTION

The present invention relates generally to computer based communication and collaboration applications, and more specifically to a method and system for providing collaborative moderation and correction of message history in an instant messaging session.

BACKGROUND OF THE INVENTION

As it is generally known, instant messaging (IM) systems have become increasingly popular for both business and personal use. Existing instant messaging systems provide real-time communication between two or more people by conveying text and/or other content between client devices connected over a network such as the Internet. Typical existing instant messaging systems operate using an instant messaging client program or the like that connects to an instant messaging service provided through one or more remote server systems. Instant messaging is sometimes referred to as "chatting" on-line, and an instant messaging session is sometime referred to as a "chat" session. Examples of existing instant messaging systems include AOL Instant Messenger, Microsoft Network (MSN) Messenger, and Yahoo! Messenger, as well as IBM Lotus Sametime®, Microsoft Office® Live Communications Server, and Jabber XCP.

Users may engage in instant messaging sessions many times a day, and are able to communicate quickly while performing multiple tasks at the same time. It is therefore very important that instant messaging clients enable users to accurately type their messages in a timely manner and with few mistakes. Aside from connectivity issues, one of the most significant problems users have when engaging in instant messaging sessions is mistakes in the actual text content. While tools exist such as "spell checkers", acronym expanders, and dictionary/thesaurus links integrated into the message window to help the user with content before it is entered into the session, existing systems provide little help in solving text problems once an instant message has been sent by the user. The resulting mistakes commonly include spelling problems, but a potentially more harmful type of mistake relates to grammar errors or word omissions in sentences, which may result in an entirely different meaning being conveyed than was intended by the message author. While spelling mistakes are often trivial and expected since messages are typed quickly in this type of communication, the more significant types of errors can be very destructive. For example, when words such as "not" or "if", or "when" are omitted, and similarly when any specific important, attitude-conveying word or proposition is left out, the session participants can be significantly misled, or might be forced to continue the conversation for much longer than necessary to resolve a simple misunderstanding, or with little time available, may even leave the session with an inaccurate understanding of what was discussed. Even worse situations may arise when participants accidentally aggravate each other because of an improperly worded sentence in a high-pressure situation. Since session transcripts are frequently copied and sent around in electronic mail messages as proof of a discussion, this may cause further confusion and unnecessary aggravation.

Conventional instant messaging system clients store session history, and allow users to review the history during the session. Conventional systems also include features that allow instant messaging clients (e.g. of the same type or brand) to interact in a dialog in addition to the text messages. For example, some existing instant messaging clients can interact to initially ask permission to start an encrypted session, or notify each other of user events outside of text typing (e.g. check spelling, window closing, status notification, etc). However, the only solution provided in existing systems correct a mistaken message that has previously been entered into the session is to simply enter more messages during the session to try to correct the previous mistake. This is cumbersome because it a) interferes with the current conversation thread, b) pollutes the overall session transcript, and c) detracts from the overall effectiveness of the collaboration.

For these reasons it would be desirable to have a tool enabling instant messaging session participants to transparently edit message text after it is sent and is part of a session history. The changes must be made with the knowledge and permission of all session participants, so that it is impossible to change session history without letting the other participants know. The new system should further allow transcript modification to work reliably in an n-way instant messaging session, address problems related to participants leaving or joining the session while the transcript is being changed, where the transcript is stored, and securing changes to the transcript to make sure that it cannot be accidentally or maliciously falsified.

SUMMARY OF THE INVENTION

In order to address the above described and other shortcomings of previous techniques, a method and system are disclosed for providing collaborative moderation and correction of instant messaging session transcripts in an instant messaging session. The disclosed system includes an improved instant messaging client user interface that allows collaborative editing and moderation of an instant messaging session transcript in order to correct for errors. In the disclosed system, an instant messaging client operates to seek approval of changes to the session transcript during the session, and stores transcript changes in a way such that the modifications are conveniently viewable by all session participants.

The disclosed system operates such that the instant messaging client can be configured to automatically accept requests to modify the session transcript. Alternatively, the instant messaging client can be configured to explicitly notify and seek approval from all other participants when a participant attempts to make a modification to the session history. In either case, the time of each automatically accepted or expressly approved modification, and the identity of the participant making each modification, are stored within the session history.

Using the disclosed system, participants can quickly modify the instant messaging session transcript as it is displayed during the session, in order to avoid confusion and misunderstanding potentially resulting from uncorrected mistakes. When the session transcript is saved or copied, the instant messaging client allows the user to select the modified session transcript, or the original, unmodified transcript including uncorrected mistakes.

When participating in an instant messaging session, a session participant has access to several user interface display areas (e.g. windows). A first user interface display area is a session transcript area, a second user interface display area enables the participant to compose a message to be entered into the session, and a third user interface display area displays visual indications of the session participants. In one embodiment of the disclosed system, a participant can select and edit text in the session transcript area, and the edited text is displayed in a fourth user interface display area (e.g. a "modified transcript" window). After making a transcript modification, the participant can click on a graphical user interface button or the like in order to submit the modification to the other session participants. If all other session participants agree to accept the proposed modification (e.g. automatically based on an automatic acceptance configuration option), then the modification is stored all the session transcripts of all participants. If one or more session participant have not configured their clients to agree to proposed modifications automatically, then those participants are presented with a message displayed outside of the session transcript display area asking for their approval of the proposed modification.

In one embodiment, after a transcript modification has been made (proposed and approved), the modification is displayed in a visually distinct manner (e.g. underlined or bolded). Additionally, when a participant hovers the cursor over the modification, context information is displayed in the user interface including such things as a) an indication of which participant made the modification, b) when the modification was made, c) the unmodified sentence, word etc., and/or other relevant information.

In another embodiment, when the instant messaging session is over, both the original unmodified session transcript and the "corrected" transcript including all accepted modifications is saved by the instant messaging session client in a session log. The corrected session transcript can be encrypted, protected from write access and signed by all session participants, so that it can no longer be modified outside of the session. This may be done automatically by the instant messaging clients, for example, the instant messaging clients may communicated to gather all approved modifications, and when all such modifications are received, the session transcript is signed and locked in to the session log.

The disclosed system may further be embodied to allow a participant that notices an error in the transcript after the session has ended to load the transcript from the log file and attempt to correct it by sending a message to the other participants asking for approval of the modification. A saved copy of the original, unmodified session transcript need not be locked and write protected, since the signed and encrypted copy of the "corrected" transcript is available, and can be verified and authenticated.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
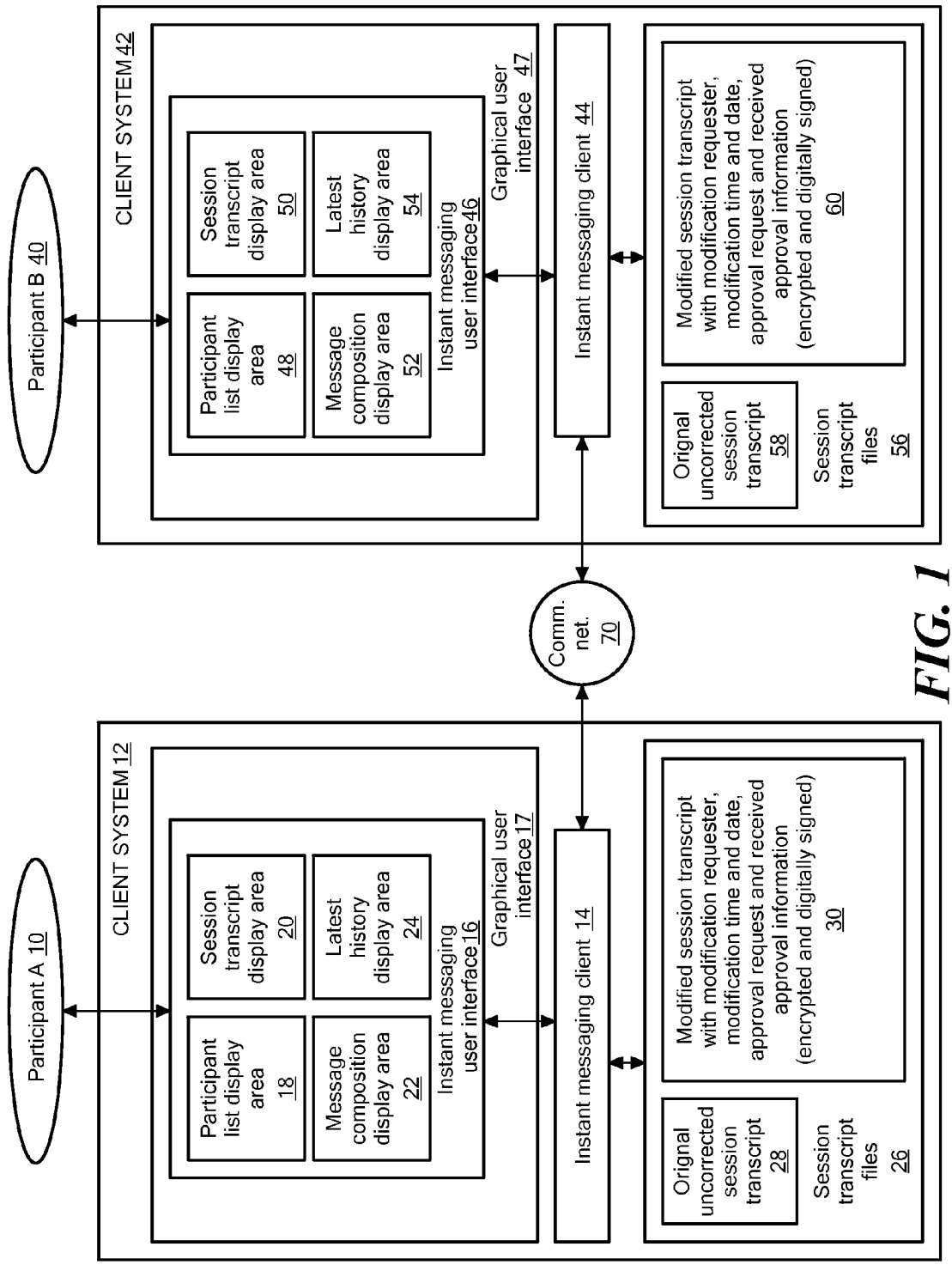
FIG. 1 is a block diagram showing hardware and software components in an illustrative embodiment of the disclosed system.

FIG. 1 is a block diagram showing hardware and software components in an illustrative embodiment of the disclosed system. As shown in FIG. 1, a first instant messaging session participant ("Participant A 10") using a first client computer system ("Client System 12") is provided an Instant Messaging User Interface 16 within a Graphical User Interface 17. The Instant Messaging User Interface 16 is generated by an Instant Messaging Client 14, and is shown including a Participant List Display Area 18, Session Transcript Display Area 20, Message Composition Display Area 22, and Latest History Display Area 24.

As further shown in FIG. 1, a second instant messaging session participant ("Participant B 40") using a second client computer system ("Client System 42") is provided an Instant Messaging User Interface 46 within a Graphical User Interface 47. The Instant Messaging User Interface 46 is generated by an Instant Messaging Client 44, and is shown including a Participant List Display Area 48, Session Transcript Display Area 50, Message Composition Display Area 52, and Latest History Display Area 54.

During operation of the illustrative embodiment of FIG. 1, instant messaging participants issue transcript modification requests that are either approved or disapproved by participants in the instant messaging session. The results of transcript modification requests approved by all session participants are displayed in the Latest History Display Areas for each participant (e.g. 24 and 54 in FIG. 1). The original, unmodified session transcript is displayed in the Session Transcript Display area for each participant (e.g. 20 and 50 in FIG. 1).

Further during operation of the illustrative embodiment of FIG. 1, the original, uncorrected instant messaging session transcript is stored, in addition to a modified session transcript. The modified session transcript stores information regarding all modification requests, including the identity of the modification requester, time and date of the request and/or when the request was approved by individual or all participants, and the status of all approval requests on a per-participant basis (e.g. sent to Participant X but no response, approved by Participant Y, rejected by Participant Z, etc.). The original, uncorrected instant messaging session transcript, and the modified session transcript, may be stored in a distributed or centralized manner. In a distributed approach, copies of the original, uncorrected instant messaging session transcript and modified session transcript are stored locally by each instant messaging client, as illustrated in FIG. 1 by the Original Uncorrected Session Transcripts 28 and 58 and Modified Session Transcripts 30 and 60 within Session Transcript Files 26 and 56 respectively. In a centralized approach, the original, uncorrected instant messaging session transcript and modified session transcript are stored remotely from the Client Systems 12 and 42, for example on one or more server systems (e.g. located within the Communications Network 70 in FIG. 1).

In one embodiment of the disclosed system, during and/or upon completion of the instant messaging session (e.g. when all participants have exited the session), the modified session transcript(s) (e.g. Modified Session Transcripts 30 and 60) are encrypted and/or digitally signed. Such encryption and/or digital signing prevents modifications from being made to the Modified Session Transcript file(s) 30 and 60 by non-session participants, and also prevents modifications from being made without approvals being obtained from all session participants, potentially both during and even after the session has ended. In addition, in a first embodiment, the Original Uncorrected Session Transcripts 28 and 58 are also saved at the end of a session (albeit not encrypted or digitally signed), but the disclosed system may alternatively be embodied such that the Original Uncorrected Session Transcripts 28 and 58 are simply not saved at the end of the session.

While for purposes of concise illustration only two session participants are shown in FIG. 1, those skilled in the art will recognize that the disclosed system may be embodied such that any specific number of instant messaging participants may be supported.

The Client Systems 12 and 42 of FIG. 1 may be any specific type of a computer system or intelligent electronic device, such as a desktop, laptop, or palmtop computer system, or a personal digital assistant, cell phone, or other electronic device. Each of the Client Systems 12 and 42 include or control a display device capable of displaying the graphical user interfaces 17 and 47 to the local users 10 and 40 of those systems, such as a liquid crystal display (LCD), cathode ray tube (CRT), interferometric modulator display (IMOD), light emitting diode (LED), or the like.

Those skilled in the art will recognize that the Instant Messaging Clients 14 and 44 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 12 and 42, and/or any server systems within the Communication Network 70 used to store original or modified session transcripts, may include one or more processors, and program storage, such as memory, for storing program code executable on such processors, as well as input/output devices and/or interfaces. As illustrated in FIG. 1, the Client Systems 12 and 42, are interconnected to a computer or data Communication Network 70 (e.g. the Internet, a Local Area Network, etc.) through one or more of such input/output devices or interfaces, and through which may further be provided communication to a number of other client systems and/or other server systems.

Figure 2:
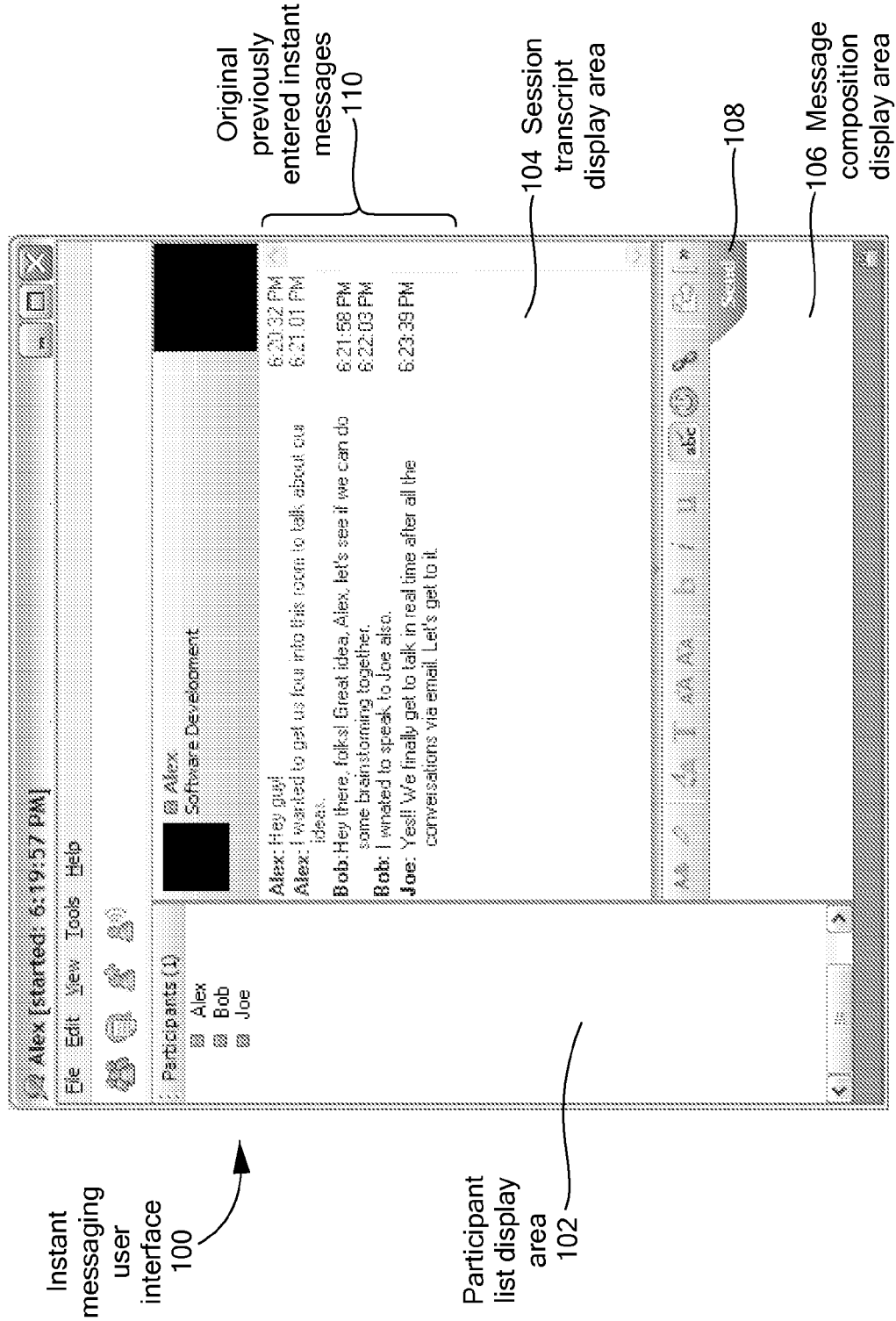
FIG. 2 is a simplified screen shot showing display objects in an instant messaging user interface generated by an illustrative embodiment of the disclosed system.

FIG. 2 is a simplified screen shot showing display objects in an example of an Instant Messaging User Interface 100 generated by an illustrative embodiment of the disclosed system. As shown in FIG. 2, the Instant Messaging User Interface 100 includes a Participant List Display Area 102, a Session Transcript Display Area 104, and a Message Composition Display Area 106. The Participant List Display Area 102 includes a list of all participants in the instant messaging session. The Session Transcript Display Area 104 displays the Original, Unmodified Instant Messages 110 previously entered by session participants. The Message Composition Display Area 106 enables a local user to compose an instant message (e.g. text) to be entered into the instant messaging session when the Send button 108 is clicked on.

Figure 3:
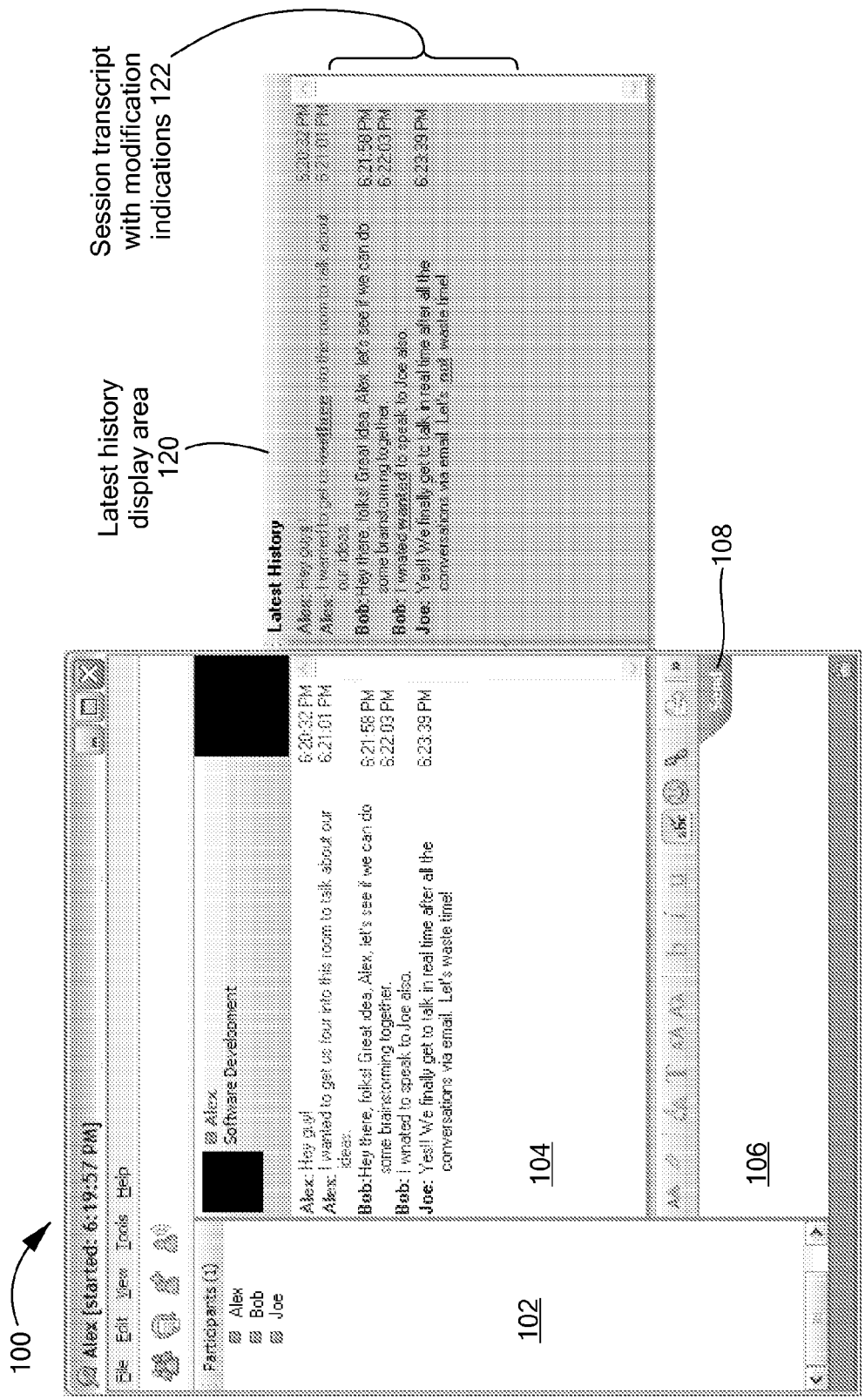
FIG. 3 is a simplified screen shot showing the instant messaging user interface of FIG. 2 with a latest history display area.

FIG. 3 is a simplified screen shot showing the Instant Messaging User Interface 100 of FIG. 2, including a Latest History Display Area 120. The Latest History Display Area 120 displays Session Transcript with Modification Indications 122, such that modifications to the original session transcript (as displayed in 104) are visually discernable (e.g. by underlining of new text and strike through of deleted text). The Latest History Display Area 120 may be caused to be displayed by a user action, such as clicking on a graphical button or other display object resulting in generation of the Latest History Display Area 120. For example, in one embodiment, the Latest History Display Area 120 is generated in response to the local user clicking on the right hand side boarder of the Session Transcript Display Area 104. The disclosed system may be embodied such that modifications are displayed in the Latest History Display Area 120 as soon as they are requested, or such that only modifications that have been approved by all session participants are displayed in the Latest History Display Area 120.

Figure 4:
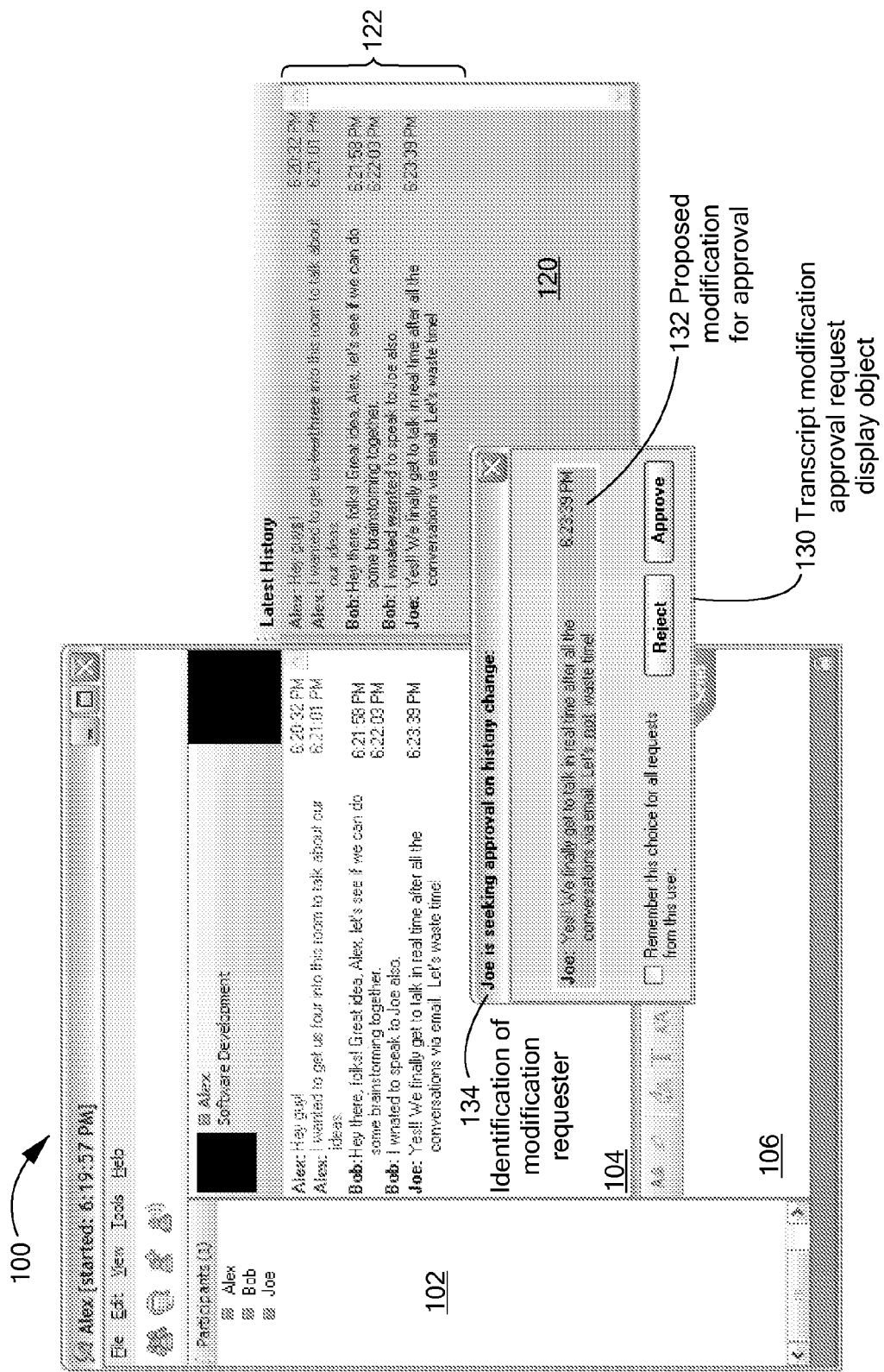
FIG. 4 is a simplified screen shot showing the instant messaging user interface of FIG. 3 with a transcript modification approval request display object.

FIG. 4 is a simplified screen shot showing the Instant Messaging User Interface 100 of FIG. 3 with a Transcript Modification Approval Request Display Object 130. In one embodiment of the disclosed system, when a session participant proposes a modification to a portion of (e.g. a previously posted message) the original session transcript, modification request messages are sent to the instant messaging clients of all other session participants, and those instant messaging clients operate in response to receipt of such requests by generating the Transcript Modification Approval Request Display Object 130 to their local users (e.g. within the Instant Messaging User Interface 100). For example, a session participant may propose a modification to a previously posted instant message through selecting an option presented in a context menu generated in response to the participant right clicking on the message within the Latest History Display Area 120. The proposed modification may be created either by editing the message within the Latest History Display Area 120, or within a separate editing area generated in the user interface specifically for that purpose.

The illustrative Transcript Modification Approval Request Display Object 130 enables a local user to either approve or reject the proposed modification by clicking on graphical buttons labeled "Approve" and "Reject", but other specific approval and rejection mechanisms may be used in the alternative. The Transcript Modification Approval Request Display Object 130 further includes an Identification of the Modification Requester 134 (e.g. "Joe"), as well as the Proposed Modification for Approval 132 (e.g. at least a portion of a previously entered instant message, with added text underlined and removed text struck out).

Figure 5:
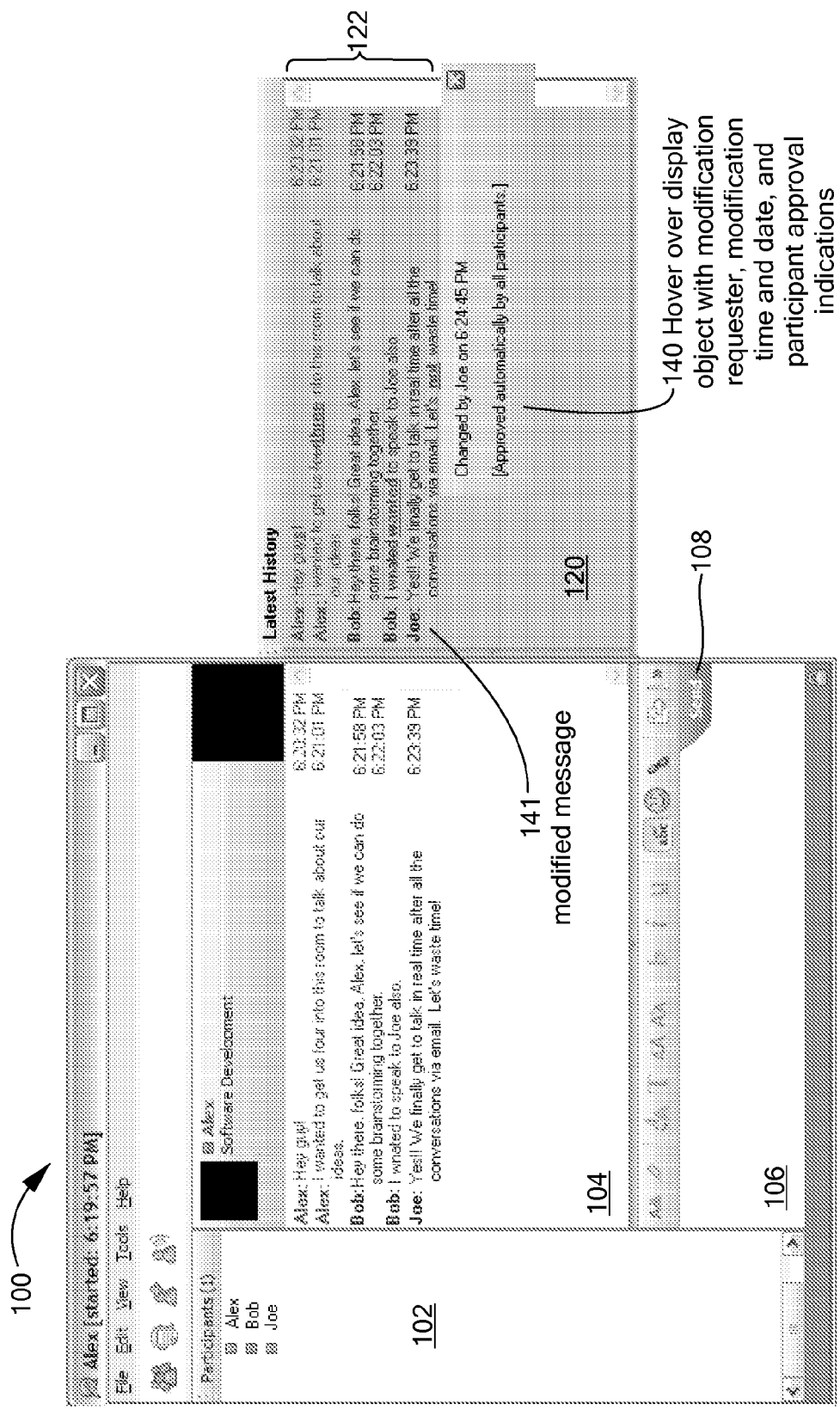
FIG. 5 is a simplified screen shot showing the instant messaging user interface of FIG. 3 with a hover over display object including modification requester, modification time and date, and participant approval indications for a modification in the latest history display area.

FIG. 5 is a simplified screen shot showing the Instant Messaging User Interface 100 of FIG. 3 with a Hover Over Display Object 140 including modification requester, modification time and date, and participant approval indications for a modification displayed in the latest history display area. For example, as shown in FIG. 5, when the user hovers the cursor over the Modified Message 141, the Hover Over Display Object 140 indicates that the modification (e.g. insertion of the word "not", as indicated by the underlining of the inserted word in the display area 120) was by a session participant having a screen name of "Joe", that the modification was made by "Joe" at 6:24:45 PM, and that the modification has been approved automatically by all session participants. In one embodiment, as illustrated in FIG. 5, session participants are provided with a configuration setting in the instant messaging client that allows them to cause all modification requests from other session participants to be automatically approved, without requiring that a user interface object such as the display object 130 of FIG. 4 be generated. Such a configuration option may be provided on a per-session basis, for example at the time a session is entered, or across all sessions.

Figure 6:
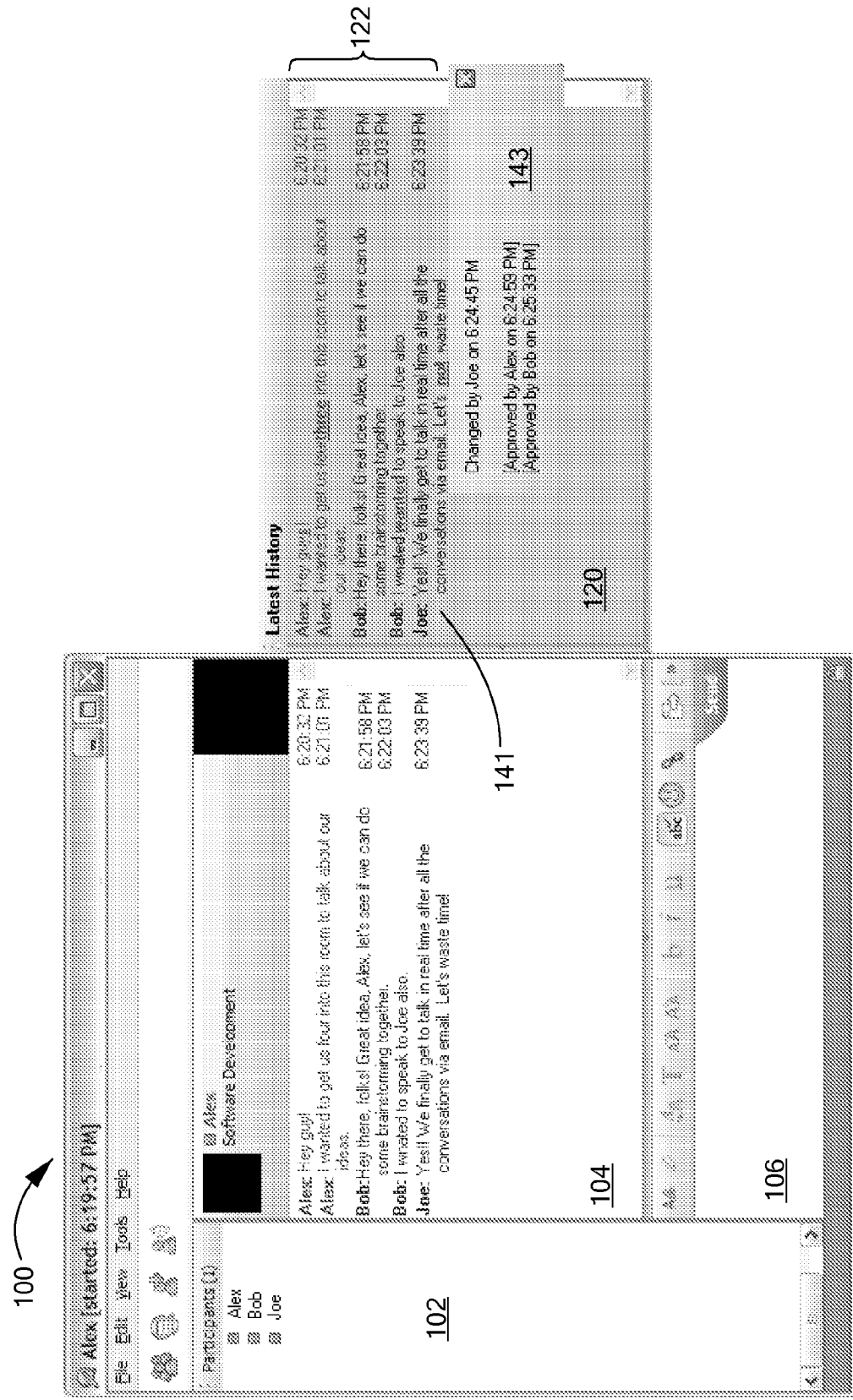
FIG. 6 is a simplified screen shot showing the instant messaging user interface of FIG. 5 including an alternative hover over display object.

FIG. 6 is a simplified screen shot showing the Instant Messaging User Interface 100 of FIG. 5 including an alternative Hover Over Display Object 143, reflecting a situation in which either auto-approval configuration is not available, or in which auto-approval of transcript modifications has not been enabled for the two session participants "Alex" and "Bob". As shown in FIG. 6, Alex expressly approved the requested modification shown in Modified Message 141 (e.g. through the display object 130 shown in FIG. 4) at 6:24:59 PM, and Bob approved the same requested modification at 6:25:33. Since Joe was the requester of the modification, there are no outstanding approval requests, and all necessary approvals have been obtained.

While the disclosed system may be embodied such that modifications must be approved by all session participants to be accepted, other alternative embodiments may allow the number and/or identity of which participants must approve of proposed modifications to be selected or otherwise indicated, for example by an initial participant of the session, a participant that scheduled the session, or some other participant.

Figure 7:
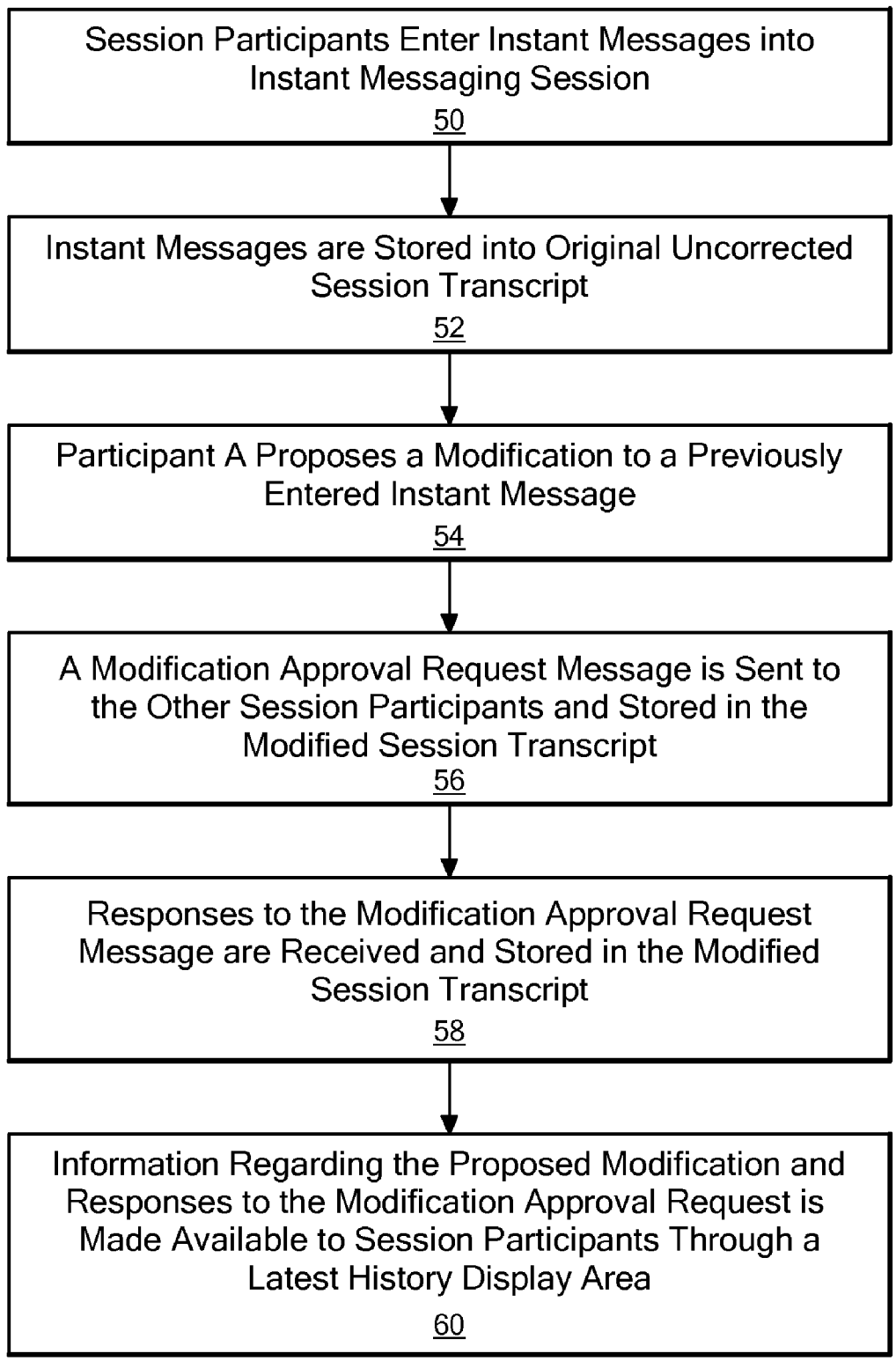
FIG. 7 is a flow chart showing steps performed in an illustrative embodiment of the disclosed system.

FIG. 7 is a flow chart showing steps performed in an illustrative embodiment of the disclosed system. At step 50, session participants enter instant messages into an instant messaging session, and those messages are stored in an original, uncorrected session transcript at step 52. At step 54, Participant A proposes a modification to one of the previously entered messages, for example by editing the message in the Latest History Display Area 120. As a result of the modification in step 54, at step 56 the disclosed system sends out a modification approval request message to the other session participants, causing a user interface display object (e.g. Transcript Modification Approval Request Display Object 130) to be displayed on the client systems of the other session participants. Further at step 56, the modification approval request message is stored (and time stamped) in the modified session transcript. The participants receiving the modification approval request message either approve or reject the modification, and messages indicating such approval or rejection are received and stored in the modified session transcript (e.g. also with timestamps) at step 58. At step 60, all session participants are able to access information regarding the proposed modification, the modification approval request message, and the responses (e.g. approval or rejection) to the modification approval request message, for example through the Latest History Display Area 120. Thus as participants approve or reject a proposed modification, the approvals and rejections are stored in the session transcript together with the proposed modification for all participants to see. Even if a proposed modification is ultimately rejected, the disclosed system advantageously enables the participants to continue to view the modification request and the responses of individual participants to the modification request.

Various embodiments of the disclosed system provide significant advantages over previous systems, as further described in the below operational examples and use cases.

Session Transcript Modification in an N-Way Instant Messaging Session

As described above, the disclosed system may be embodied such that during an instant messaging session, both an original, unmodified transcript (e.g. 28 and 58 in FIG. 1), as well as a modified session transcript (e.g. 30 and 60 in FIG. 1) that is digitally signed by each participant. In one embodiment, only the digitally signed copy of the modified transcript is persistently stored.

Digital signatures are used in the disclosed system to ensure authenticity of changes made by session participants to the session transcript. Each approval and/or rejection stored in the session transcript is associated with the user that made it. The digital signing of such actions may be performed on a per-message basis, or across the entire session at the end of the session. In one embodiment, approvals of modification requests and the like are digitally signed during the session, e.g. using an approach in which each participant action requires a digital signature from the instant messaging client of that participant. While such an embodiment is highly secure, it may have performance consequences resulting from the need to re-generate a digital signature for each action. In an alternative embodiment, the digital signature of a participant is provided for approved/rejected modifications at the end of the instant messaging session, e.g. when a participant logs off. In addition, to address the situation where a participant may be involuntarily dropped from the session without one or more of their action being authenticated, embodiments are described below that may store the transcript either within client systems or in a central server system. In such embodiments, the instant messaging client and/or a server process may operate to follow up with the involuntarily dropped participant in order to ensure that actions performed by that participant are completely confirmed and verified as needed in order to provide authentication across the whole session transcript.

During the instant messaging session, when a session participant makes a modification to the transcript, this event is distributed as change approval request messages to all other participants, for example using a conventional instant messaging protocol. These change approval request messages ask the other session participants to approve (i.e. "sign off on") the modification. The change approval request message is propagated and visible within all of the modified session transcripts, but it is not "finalized" until other session participants have approved it. As shown in the Figures, a Latest History Display Area 120 is generated that enables session participants to view the contents of the digitally signed modified session transcript. For example, as shown in FIGS. 5 and 6, session participants can hover over the changes shown in Display Area 120, and conveniently see the approval status each modification. In one embodiment, if a participant has not approved a modification, that participants name is listed in a visually distinct way within the Hover Over Display Object 143. e.g. with an "x" next to their screen name, with their screen name grayed out, etc.

Handling the Ad-Hock Nature of an Instant Messaging Session and Storage Options for the Session Transcript It is unrealistic to assume that all instant messaging participants will be on-line for the entire duration of an instant messaging session. However, previous systems have not sufficiently addressed problems related to transcript modification in the face of participants entering and exiting during the session. The disclosed system handles these events gracefully while maintaining the integrity of a digitally signed modified session transcript, since all modification requests are stored with the modified session transcript, regardless of whether the requests have been fully approved. Accordingly, if a modification request has not been approved when the requesting participant inspects the modification status in the Latest History Display Area 120 (e.g. through the Hover Over Display Object 143), the requesting participant can immediately see which participants have not yet approved the modification. The requesting participant can then follow-up with the other participants that have not yet approved the modification, either within the instant messaging system, or using another communication mode (e.g. telephone, e-mail, etc.). This capability is useful not only to maintain the integrity of the modified session transcript, but also to ensure strict compliance with possible audit control requirements in many enterprises. Such requirements may be associated with any stored document, such as the stored modified session transcripts of the disclosed system. Moreover, this feature of the disclosed system makes it relatively easy to integrate the disclosed system with existing workflow systems, in order to drive approvals of changes as in a regular workflow scenario, and potentially taking advantage of existing collaboration/notification applications outside of the instant messaging system. Finally, the disclosed system allows for a graceful failure in the event of an unreliable request/approval exchange (e.g. resulting from intermittent network problems), and does not lock the enterprise in support of a particular exchange scheme. An enterprise may even choose not to deploy/require exchanging request/approvals after the instant messaging session is over, e.g. because of the resulting complexity, while still maintaining information in the modified session transcript indicating who requested specific modifications, and which of the requesting modifications were accepted/rejected.

As noted above, the disclosed system may be embodied such that the modified session transcript may be stored either within the client systems, or centrally on a server. In some situations, an enterprise may decide to have very strict control of what users communicate about, and may require server-stored session transcripts. In such scenarios, the server can simply store the session transcript in a common repository using an approach similar to that used in a discussion forum (e.g. storing the discussion thread in a single file). Since all approvals and/or the lack thereof are recorded within the session transcript, together with the other session messages, a server process can conveniently make determinations of when more approvals are needed for a given modification, and can accordingly notify users that their approval of a modification is needed, e.g. as they log in to the instant messaging system. Alternatively, when the disclosed system is embodied such that the instant messaging clients are relied on to store their own copies of the modified session transcript, a mechanism described below may be used in this regard.

When session transcripts (e.g. modified and/or original) are stored in a distributed manner (i.e. in client systems), modification approval requests may be advantageously handled by an embodiment of the disclosed system. In such an embodiment, in the case where there are N participants in a session, the instant messaging client stores a session transcript per session, and further records in the transcript information describing when participants join and leave the session (as well as other participant specific status or event changes, such as indications of whether a participant has a status of "away", "in meeting", etc). The transcript modification approval requests are distributed to session participant the same way instant messages are, and are stored in the session transcript (e.g. in the modified session transcript). When a modification approval request has been approved or rejected by a given participant, the modification approval is a message that is sent from the participant's client system and stored in the session transcript just like any other message.

The disclosed system may be embodied to hide or display modification approval requests and the resulting approvals/rejections in the user interface. For example, FIGS. 5 and 6 show a Hover Over Display Object provided for this purpose. Alternatively, the disclosed system can be embodied to display modification approval request and resulting approval/rejection information/status in a top level display object (e.g. a separate display window). Also, if modification approval requests, and the associated approvals and rejections, are deemed more important than actual instant messages, a separate, more reliable protocol (e.g. some form of reliable multicast) can be used to handle the broadcasting of those messages. In any case, all such modification related messages are recorded with timestamps and sender information within the session transcript file (e.g. modified session transcript).

A number of use cases are now described to further illustrate operation of embodiments of the disclosed system. For purposes of explanation, several scenarios are now described in which N participants started an instant messaging session at a time t0.

In a first example, at time t1>t0, a first session participant initiates a transcript modification, and the disclosed system generates modification approval requests that are transmitted to all other session participants. Since the session transcript of the disclosed system records timestamps indicating the times at which specific, individual participants join and leave the session, this information can be used to determine which users must be sent the modification approval requests. If within a predetermined time period a participant does not acknowledge the modification approval request (i.e. neither approves nor rejects it), that participant has either (a) exited the session, or (b) been dropped off-line, e.g. because of a software crash, network problem, etc., or (c) decided to ignore the modification approval requests. To address the third possibility (c), the disclosed system may be embodied such that the instant messaging client receiving the modification approval request can be configured to periodically repeat the display of the modification approval display object (e.g. display object 30 of FIG. 4) to that participant until they respond, and to store received modification approval request messages in a queue separate from a received message queue until the requests are approved or rejected, and further such that the instant messaging client prompts the participant to respond to such queued approval requests before the participant can close the user interface display window containing the instant messaging session, and/or perform other reminder operations.

To address situation (a), in which a participant has exited the session prior to responding to a transmitted modification approval request, e.g. either before or after the request is delivered to the participants instant messaging client, the disclosed system may perform a number of steps. In the case where the modification approval request message is delivered prior to the participant exiting the session, the participant's instant messaging client may operate to notify the participant of the need to respond to the request when the participant exits the session, as described above. Also, when the participant logs back into the instant messaging system later, the instant messaging client operates to display a list or the like of modification approval requests that have been received but not yet responded to. This is possible because the disclosed system records received modification approval requests in the modified session transcript. Accordingly, either the instant messaging client or a remote instant messaging server process can be embodied to remind a given system user regarding a modification approval request until either the participant responds, or until a time threshold is reached. In another embodiment, an associated work item can be placed on the work queue of the recipient of a modification approval request message when the disclosed instant messaging system is integrated with a third-party workflow solution or the like.

In situation (b), in which the participant from whom modification approval is requested is dropped off-line before they have responded to the request, for example due to a network error or software failure, the necessary information for providing appropriate reminders to the participant again is stored with the modified session transcript. It is again the responsibility of the instant messaging client of the modifying participant to query the other participants for approval of the request. The instant messaging client can accordingly be configured to send the modification approval request to a central instant messaging server process that handles message routing, and to additionally notify the server process when a response is still needed from a specific participant. The server process can then notify the non-responsive participant the next time (s)he signs on to the instant messaging system (e.g. for a configurable number of times), asking the user to approve/reject the approval request. Thus the disclosed system may be embodied to store modification approval request messages within dedicated off-line queues, and the instant messaging server configured to store a session transcript only for the duration of consensus gathering or until a specified time-out period.

Alternatively, in a decentralized-transcript-storage embodiment of the disclosed system, the instant messaging client itself can wait for the non-responding participant to come back on-line, and then ping them automatically with a reminder message. This approach can be implemented via extension of existing events in instant messaging clients. For example, in one embodiment, a "transcript synchronization" event extension or the like can be implemented to extend a "Notify when user is on-line" alert provided by the instant messaging system. The disclosed system can also be embodied to take advantage of any other specific ways to notify a participant that (s)he has a modification approval request to respond to in a "workflow"-like fashion (e.g. by integrating with an external workflow system via one or more Application Programming Interfaces (APIs). In one embodiment, operation may involve automatically sending a non-responding participant an e-mail message with the modified session transcript attached (e.g. in an embodiment in which the instant messaging system server process is integrated with a Message Transfer Authority (MTA) or the like).

In another use case example of operation, at a time $t1>t0$, a subset M of session participants exit the session. At a time $t2>t1>t0$, a participant creates a modification approval request to be transmitted to the other session participants. The instant messaging client uses the stored information within the modified session transcript regarding when specific participants join and leave the session to determine the list of participants to which the modification approval request messages are to be sent. If the modification involves a message created in at a time tn, where $t2>tn>t1$, then participants in M are excluded from that list of participants to which the modification approval request messages are sent, because they have not seen or authored the message being modified. Once the list of participants to which the modification approval request messages are to be sent is ready, the system follow the steps described above to determine whether the modification is approved or not.

In another use case example of operation, at a time $t1>t0$ new participants join the session. At a time $t2>t1>t0$, a participant creates a modification approval request message to be sent to the other session participants. Operation in this case is similar to that described above, with exception that the instant messaging system operates with regard to the newly joining session participants by sending them the existing modified session transcript. This is necessary in order for the newly joining members to be caught up on the context of the discussion. Once all members have the current modified session transcript, the same process as described above takes place to determine whether the modification is approved. The sending of an existing modified session transcript to newly joining participants is not required for transcript synchronization to operate correctly, and accordingly the disclosed system may be embodied or configured to operate without sending a current session transcript to newly joining participants, for example when participants do not want newly joining participants to have access to the contents of the session that was entered prior to their joining the session.

Securing the Session Transcript to Preserve its Authenticity

Securing a session transcript in a way that allows users to change it is an important requirement for an instant messaging system in an enterprise setting. In the disclosed system, the modified session transcript is digitally signed by the session participants, and accordingly only they can read it or write to it to approve/reject changes after the session is over. The disclosed system may further be embodied to provide an "auditor" user read access to the session transcript in addition to the session participants. The modified session transcript may be implemented such that it can be opened only in the instant messaging client system, so that the instant messaging client can enforce all access control rules. The modified session transcript itself, may be embodied as an encrypted and signed file that resides in a file system directory (on each session participant's client system, in the case of a decentralized-transcript-storage embodiment). Accordingly, if the modified session transcript file is opened by a third-party application that does not know how to decrypt it or read the signatures, unauthorized writes to the transcript will corrupt it—thus preventing malicious control over a shared, protected resource. If, in the alternative, the modified session transcript resides only on a server system, then it can be completely protected from unauthorized writes to avoid both improper access and content corruption. The instant messaging clients may encrypt the modified session transcript such that only previous participants are allowed access to it. This encryption may be implemented by a number of conventional encryption algorithms.

Once the modified session transcript is opened in the instant messaging client (and it is verified that the current user can view the transcript), the instant messaging client's software determines if the user needs to approve/reject any outstanding modification approval requests, notifies the user of those requests, and enables the user to respond to them. When the user is done responding to the modification approval requests, the modified session transcript file is signed by that user, and encrypted again to be ready for future transmission. Next, either a workflow API can be called to forward the modified session transcript to the other remaining participants from which approval request responses are still needed, or the modified session transcript is sent back to the centralized instant messaging server to be routed to those remaining participants from which responses are required. It is the job of an instant messaging server process or the workflow system to merge all the received approvals/rejections. For example, in an embodiment in which the instant messaging server maintains all session transcripts, the "signed" transcript may remain on the server. In an embodiment with decentralized transcript management, then the server process broadcasts the updated transcript to all session participants that were able to view the requested modification.

While the above description regarding illustrative embodiments of the disclosed system includes examples of specific user interface display objects, such as graphical buttons, menus, dialog boxes, and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

I claim:

1. A computer implemented method for collaborative modification of instant messaging session transcripts in an instant messaging session, comprising:

receiving a plurality of original instant messages into said instant messaging session from a plurality of participants in said instant messaging session;

storing said original instant messages into an uncorrected session transcript;

receiving, from a first one of said participants, a proposed modification to one of said original instant messages;

storing said proposed modification in a modified session transcript separate from said uncorrected session transcript;

transmitting, to all of said participants other than said first one of said participants, in response to said receiving of said proposed modification from said first one of said participants, a modification approval request message;

storing said modification approval request message in said modified session transcript;

receiving approve modification and reject modification responses from said participants other than said first one of said participants;

storing said received approve modification and reject modification responses in said modified session transcript; and displaying, in a latest history display area of a graphical user interface displayed to said first one of said participants, said modified session transcript with visual indications of said received approve modification and reject modification responses.

2. The method of claim 1, further comprising:

generating, in response to receipt of said modification approval request message, a transcript modification approval request display object on each client system of each of said participants other than said first one of said participants, wherein said transcript modification approval request display object includes an approve modification selectable option and a reject modification selectable option.

3. The method of claim 2, further comprising:

generating a modification display object displaying information regarding said modification approval request message and said approve modification and reject modification responses.

4. The method of claim 3, wherein said modification display object comprises a hover over display object generated in response to a user hovering a cursor over said proposed modification within said display of said modified session transcript within said latest history display area.

5. The method of claim 4, wherein said information regarding said modification approval request message and said approve modification and reject modification responses includes indications of which participants have approved the modification, and which participants have rejected the modification.

6. The method of claim 5, further comprising:

storing a modification approval request timestamp in association with said proposed modification in said modified session transcript, said modification approval request timestamp indicating a time at which said modification approval request message was transmitted;

storing a receipt timestamp in association with each of said approve modification and reject modification responses, each said receipt timestamp indicating a time at which a corresponding one of said approve modification and reject modification responses was received; and wherein said information regarding said modification approval request message and said approve modification and reject modification responses includes said modification approval request timestamp and said receipt timestamps for said approve modification and reject modification responses.

7. The method of claim 6, further comprising storing indication of when each session participant enters said session and when each participant leaves said session in said modified session transcript.

8. The method of claim 7, further comprising encrypting said modified session transcript such that only session participants can access said modified session transcript.

9. The method of claim 8, further comprising digitally signing said modified session transcript by each of said session participants.

10. The method of claim 9, further comprising:
upon termination of said instant messaging session, storing said modified session transcript in a session log file and deleting said uncorrected session transcript.

11. The method of claim 9, further comprising:
upon termination of said instant messaging session, storing both said modified session transcript and said uncorrected session transcript into at least one session log file.

12. The method of claim 9, further comprising:
enabling one of said session participants to automatically approve said proposed modification; and
wherein said information regarding said modification approval request message and said approve modification and reject modification responses includes an indication that said proposed modification was automatically approved.

13. The method of claim 1, further comprising:
displaying said modified session transcript such that only approved modifications are displayed.

14. The method of claim 1, further comprising:
displaying said modified session transcript such that modifications are displayed as soon as they are requested.

15. A system for collaborative modification of instant messaging session transcripts in an instant messaging session, said system including at least one processor and a computer readable program storage memory for storing program code executable on said at least one processor, said program code comprising:
program code for receiving a plurality of original instant messages into said instant messaging session from a plurality of participants in said instant messaging session;
program code for storing said original instant messages into an uncorrected session transcript;
program code for receiving, from a first one of said participants, a proposed modification to one of said original instant messages;
program code for storing said proposed modification in a modified session transcript separate from said uncorrected session transcript;
program code for transmitting, to all of said participants other than said first one of said participants, in response to said receiving of said proposed modification from said first one of said participants, a modification approval request message;
program code for storing said modification approval request message in said modified session transcript;
program code for receiving approve modification and reject modification responses from said participants other than said first one of said participants;
program code for storing said received approve modification and reject modification responses in said modified session transcript; and
program code for displaying, in a latest history display area of graphical user interface displayed to said first one of said participants said modified session transcript with visual indications of said received approve modification and reject modification responses.

16. A computer program product in a computer readable memory, wherein said computer readable memory has program code stored thereon operable when executed on a computer system to cause said computer system to provide collaborative modification of instant messaging session transcripts in an instant messaging session, said program code comprising:
program code for receiving a plurality of original instant messages into said instant messaging session from a plurality of participants in said instant messaging session;
program code for storing said original instant messages into an uncorrected session transcript;
program code for receiving, from a first one of said participants, a proposed modification to one of said original instant messages;
program code for storing said proposed modification in a modified session transcript separate from said uncorrected session transcript;
program code for transmitting, to all of said participants other than said first one of said participants, in response to said receiving of said proposed modification from said first one of said participants, a modification approval request message;
program code for storing said modification approval request message in said modified session transcript;
program code for receiving approve modification and reject modification responses from said participants other than said first one of said participants;
program code for storing said received approve modification and reject modification responses in said modified session transcript; and
program code for displaying, in a latest history display area of a graphical user interface displayed to said first one of said participants said modified session transcript with visual indications of said received approve modification and reject modification responses.

* * * * *